UNITED STATES PATENT OFFICE.

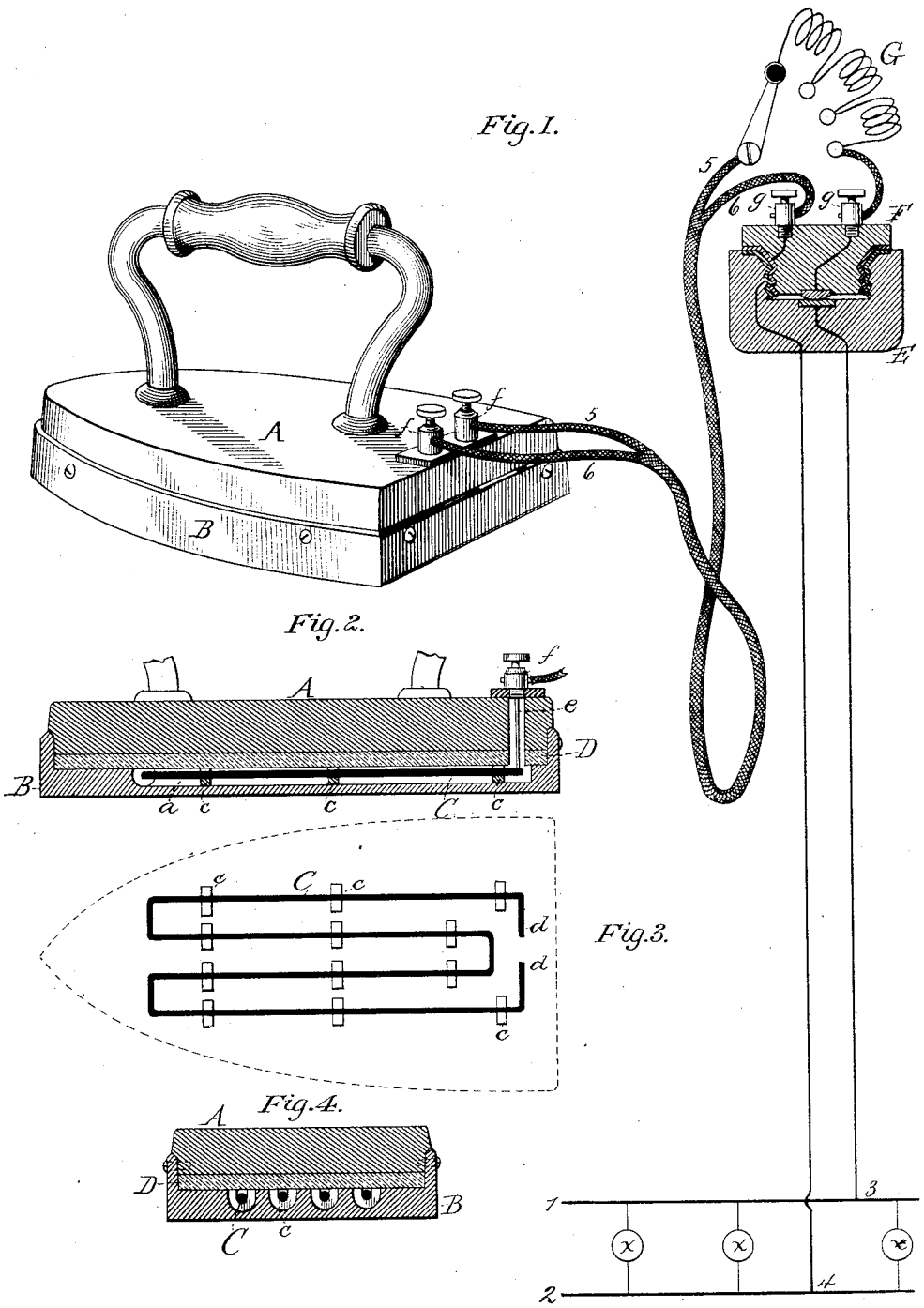

HENRY W. SEELY, OF NEW YORK, N. Y., ASSIGNOR OF TWO-THIRDS TO RICHARD N. DYER AND SAMUEL INSULL, OF SAME PLACE.

ELECTRIC FLAT-IRON.

SPECIFICATION forming part of Letters Patent No. 259,054, dated June 6, 1882.

Application filed December 8, 1881. (No model.)

*To all whom it may concern:*

Be it known that I, HENRY W. SEELY, a citizen of the United States, residing at New York, in the county and State of New York, have invented a new and useful Electric Flat-Iron, of which the following is a specification.

The object of my invention is to utilize electric currents derived from any suitable source of electric energy for the purpose of heating flat-irons, fluting-irons, and other similar utensils. To accomplish this object I place within the iron and close to its face a resistance, preferably of carbon, and of such size and shape that it will heat the face of the iron sufficiently and equally. This resistance has terminals, by means of which it may be connected in an electric circuit, preferably a multiple-arc circuit of an electric lighting system.

In the accompanying drawings, Figure 1 is a perspective view of a flat-iron connected with a multiple-arc system of electric lighting; Fig. 2, a vertical longitudinal section of the iron; Fig. 3, a plan view of the heating-resistance, and Fig. 4 a transverse vertical section of the iron.

Similar letters of reference refer to corresponding parts in all these figures.

The base of the flat-iron is made in two parts, A B, the upper part, A, fitting into the lower one, B. In the interior of B is formed a groove, $a$, whose shape corresponds to that of the carbon resistance C, which is laid in the groove. This resistance is preferably molded or formed as one continuous piece of carbon, though, instead of this, a number of carbon sticks could be laid parallel in grooves connected together by wires electroplated to their ends. To prevent contact between the carbon and the metal below and around it, it is laid in supporting-saddles $c\,c$, of some suitable non-conducting and non-combustible material.

Above the resistance is placed a layer, D, of an insulating substance, which is also both non-combustible and a poor conductor of heat. This substance is preferably one which can be put in its place while in a soft or plastic condition and then allowed to harden—as, for instance, plaster-of-paris. Before pouring in such substance the grooves and resistance should be covered with a sheet of paper or similar material, in order that the plastic substance may not penetrate between the carbon and the iron, and thus impair the conduction of heat between them. The upper part, A, of the iron is set directly upon the top of the insulating substance D, and is secured to the lower part by rivets, or in any other suitable manner.

If desired, a packing of felt or other substance which is a non-conductor of heat may be placed in the joint between A and B, so that all the heat will be retained in the lower part of the iron.

The ends $d\,d$ of the resistance C are electroplated or otherwise attached to wires which pass up through an aperture, $e$, (being insulated from the iron where they pass through it,) to binding-posts $f\,f$, attached to a plate of insulating material fastened to the top of the base. By means of these binding-posts connection is made with the wires from any suitable source of electricity.

In Fig. 1 the flat-iron is shown in connection with a multiple-arc system of electric lighting. 1 2 are floor-mains of the system in derived circuits, from which are placed incandescent electric lamps, (represented at $x\,x$.) 3 4 is a multiple-arc circuit leading to the interior terminals of an ordinary lamp-socket, E. From this the lamp has been removed, and instead a plug, F, having exterior terminals corresponding to the socket-terminals, is placed in the socket. The plug-terminals are connected to binding-posts $g\,g$, from which flexible conducting-wires 5 6, of sufficient length to allow the iron to be moved back and forth, lead to the binding-posts $f\,f$.

An adjustable resistance, G, may, if desired, be placed in the circuit between the socket and the iron, in order that the heat of the latter may be properly regulated.

A safety-catch should be provided, preferably located within the plug F, to protect the system in case of a short circuit occurring.

It is evident that my invention could be applied to fluting-irons in which a curved corrugated iron bears on a corrugated base by placing a heating-resistance in the base, or in both the base and the moving iron.

What I claim is—

1. The combination, with a flat-iron or similar utensil, of an electrical resistance located within the same, the face of said iron being heated by radiation from said resistance, substantially as set forth.

2. A chambered flat-iron or similar utensil, in combination with an electrical resistance inclosed entirely thereby, whereby all the heat radiated from such resistance will be utilized, substantially as set forth.

3. A chambered flat-iron or similar utensil, in combination with an electrical resistance inclosed thereby, and a layer of non-heat-conducting material to confine the heat to the face of the iron, substantially as set forth.

This specification signed and witnessed this 6th day of December, 1881.

HENRY W. SEELY.

Witnesses:
 RICHD. N. DYER,
 SAMUEL INSULL.